(12) United States Patent  (10) Patent No.: US 6,304,791 B1
Kim  (45) Date of Patent: Oct. 16, 2001

(54) METHOD FOR CONTROLLING SEMICONDUCTOR EQUIPMENT INTERLOCKED WITH A HOST COMPUTER

(75) Inventor: Sung-geun Kim, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/137,935

(22) Filed: Aug. 21, 1998

(30) Foreign Application Priority Data

Oct. 31, 1997 (KR) .................................................. 97-57377

(51) Int. Cl.$^7$ ...................................................... G06F 19/00
(52) U.S. Cl. ........................... 700/121; 700/28; 700/110; 700/30; 700/79
(58) Field of Search .................................... 700/121, 110, 700/84, 181, 28, 30, 79, 80; 395/500.02; 382/149

(56) References Cited

U.S. PATENT DOCUMENTS 5,923,553 * 7/1999 Yi ..................................... 364/468.17
6,000,830 * 12/1999 Asano et al. ..................... 364/468.28

* cited by examiner

*Primary Examiner*—Ario Etienne
*Assistant Examiner*—Firmin Backer
(74) *Attorney, Agent, or Firm*—Jones Volentine, PLLC

(57) ABSTRACT

A method for controlling semiconductor fabrication equipment prevents an operator from accidently operating a piece of equipment which is in an interlocked state, since a host computer automatically stores information on any interlocked piece of equipment, and rechecks that information before allowing any product to be introduced into a piece of equipment. Optimal process conditions for each process are registered in the host computer. The registered optimal process condition is compared with process data reported from each piece of equipment. If it is determined that the reported data are in the range of the optimal process conditions in view of the comparison, it is then determined whether or not the reported data also satisfy a specific rule registered in the host computer. If it is determined that the reported data satisfy the specific rule, the process continues. Otherwise, if it is determined that the reported data do not satisfy the specific rule, the equipment and a tracking module of the host computer are simultaneously interlocked and the interlocking is automatically saved in the host computer. The process is stopped until the process failure is solved.

3 Claims, 2 Drawing Sheets

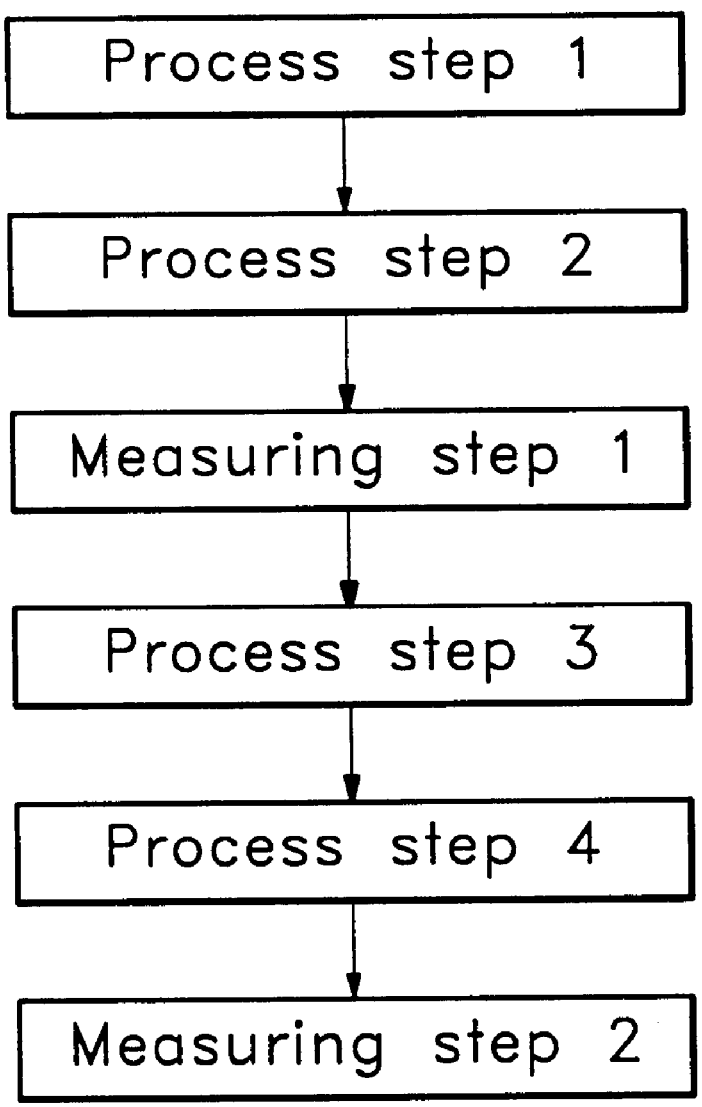

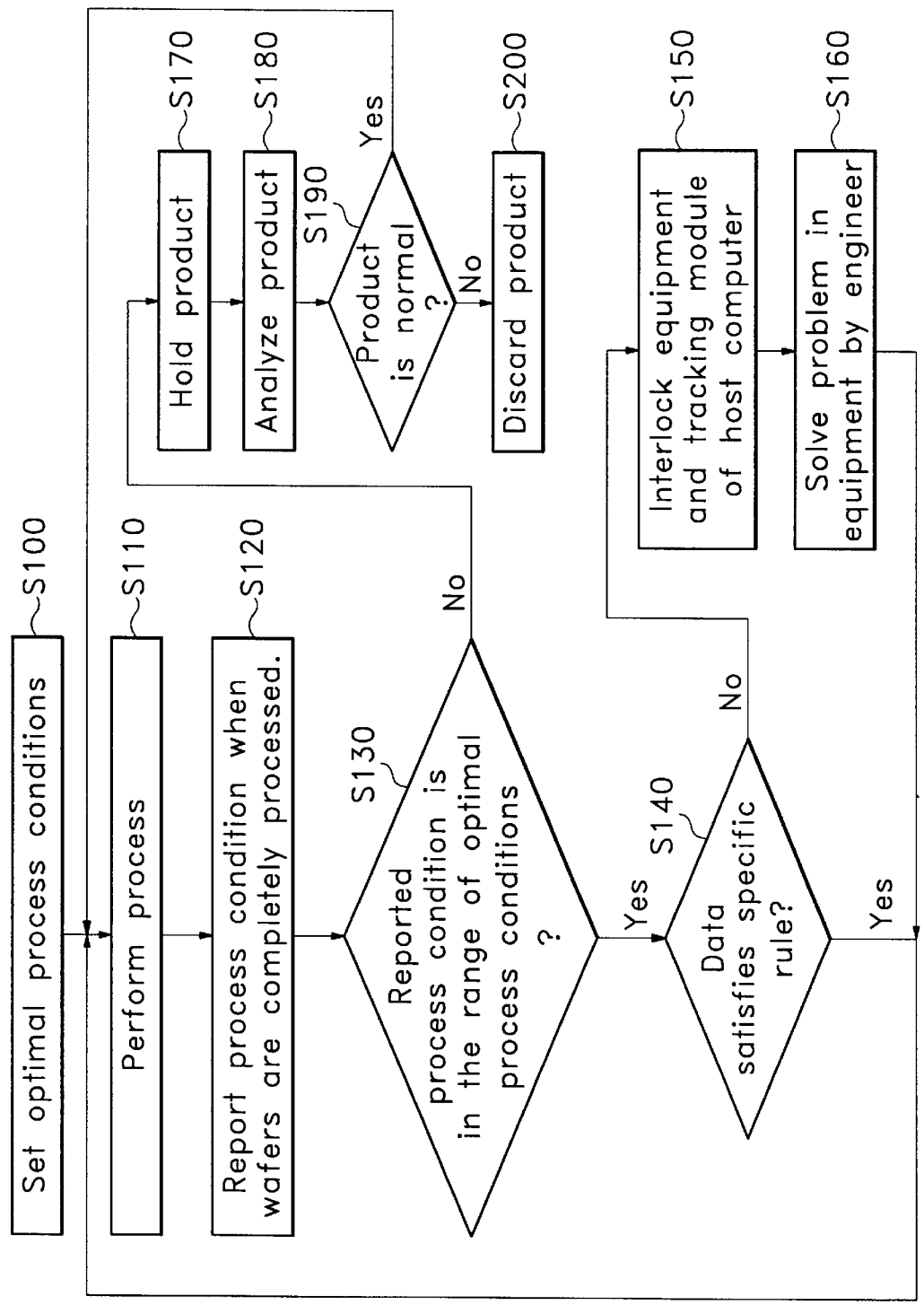

METHOD FOR CONTROLLING SEMICONDUCTOR EQUIPMENT INTERLOCKED WITH A HOST COMPUTER

BACKGROUND OF THE INVENTION

1. Field of the Invention

The present invention relates to a method for controlling semiconductor fabrication equipment and, more particularly, to a method for simultaneously and automatically controlling semiconductor fabrication equipment and a computer system such as a host computer.

2. Background of the Related Art

Semiconductor device fabrication includes a large number of processes, requiring a large amount of equipment (i.e., sputtering equipment, deposition equipment, etching equipment, etc.) to be disposed on a fabrication line. Within this equipment, wafers grouped as unit lots of approximately 20 to 25 wafers are processed under optimal conditions for the respective steps of the process.

If the equipment performs the process according to an offline technology, data generated during the respective steps are displayed on the monitor of the equipment. If the equipment performs the process according to an online technology, the data are stored in the data base of a host computer connected to the equipment.

FIG. 1 is a flowchart illustrating a conventional method for controlling semiconductor fabrication equipment. In the method, a determination as to whether the process is performed under the optimal process conditions for the respective steps is made through a measuring step after several steps are performed as shown in FIG. 1. At the measuring step, it is determined whether or not the products processed through the several steps are defective. If it is determined that the products are defective at the measuring step, the result is displayed on the monitor of the equipment which performs the process, or the causes of the defects are detected using data stored in the data base of the host computer.

In other words, in the event that the process is performed under poor conditions, the determination as to whether or not the products are defective cannot be made immediately after one step is completed. Moreover, in the event that the defects in the products are detected at the measuring step after several process steps are carried out, the process steps are traced back so as to detect the causes of the defects. This may result in loss of time and material.

Such poor process conditions may occur when the process condition for a certain step has not been set to its optimal condition due to an error on the part of an engineer, when lots are continuously processed under a condition wherein process condition input was improper, or when a process is continuously performed under a condition wherein process ambient has not been set to its optimal condition due to operation failure of the equipment itself.

Accordingly, a method for equipment control is used, which method is capable of suppressing the poor condition associated with the above cases. In the method, data generated in the equipment are compared with specification values which are initially registered in the data base of the host computer. If the equipment-generated data are not in the range of the specification values, the equipment is switched to an interlocked state.

However, the method suffers from several disadvantages. When the fabrication equipment is controlled according to the method, only the equipment is interlocked and the information on the interlocked equipment (for example, the intrinsic number of the interlocked equipment) is not saved in the host computer. Thus, the actual state of the interlocked equipment is different from the state thereof recognized by the host computer. Accordingly, the host computer cannot identify the interlocked equipment.

Generally, when equipment is interlocked, an alarm signal is generated in an alarm device installed on the equipment. According to the alarm signal, the operator informs the engineer that the equipment is interlocked by means of a communication device such as a telephone. The engineer then takes appropriate action on the interlocked equipment to solve the problem thereof and informs the operator that the problem of the equipment has been solved. Then, the operator releases the interlocked state of the equipment and returns the equipment to the fabrication process. In this method, the operator must check every piece of equipment, without omission, in order to determine whether or not the equipment became interlocked during the respective fabrication steps. This work requires a great amount of time and labor. For this reason, the operator actually cannot check all the equipment.

When an operation command is accidently inputted into the host computer by the operator when the problem in the interlocked equipment has not been solved by the engineer, the host computer cannot recognize the fact and the steps of the process are continuously performed by the equipment under an improper set condition. The improperly set condition may result in an increase in defective products and degraded process reliability.

SUMMARY OF THE INVENTION

It is therefore an object of the present invention to provide a method for controlling semiconductor fabrication equipment, which is capable of preventing an operator from accidently operating an interlocked piece of equipment. The method includes a determination of whether or not a process is being performed normally, under a process condition registered in a data base of a host computer in the range of a specific rule, at the same time that respective steps of the process being performed are completed. If it is determined that the process is not being performed normally, the equipment and a tracking module of the host computer are simultaneously interlocked and thereby the intrinsic number of the interlocked equipment is automatically inputted into the host computer. Accordingly, the host computer can recheck whether or not to introduce the following lot into the equipment. Thereby, the operator is prevented from accidently operating the interlocked equipment.

To achieve the above object and other advantages, the present invention provides a method for controlling semiconductor fabrication equipment, including the steps of: reporting process condition data, of a process being performed on a unit lot of product in a piece of the semiconductor fabrication equipment, to a host computer connected to the equipment, and determining whether or not the reported process condition data are in the range of optimal process conditions for the process as registered in a data base of the host computer. If it is determined that the reported process condition data are in the range of optimal process conditions, it is then determined whether or not the reported process condition data satisfy a specific rule registered in the host computer. If it is determined that the reported process condition data are not in the range of optimal process conditions, a step is performed of holding and analyzing the unit lot of product processed through the process and taking appropriate action. If it is determined that the reported process condition data satisfy the specific rule, the unit lot of product is allowed to proceed to a subsequent process. If it is determined that the reported process condition data do not satisfy the specific rule, additional steps are performed including simultaneously interlocking the piece of equipment and a tracking module of the host computer, automatically saving the interlocking information in the host computer and stopping the process until a cause of the operation failure is determined and removed, and repeatedly performing the above steps until the fabrication of the unit lot of product is completed.

The specific rule is a control limit derived from statistical process control (SPC) of the process. The method for controlling semiconductor fabrication equipment may further include the steps of: after analyzing the unit lot of product processed through the process and taking appropriate action, determining whether or not the unit lot of product is defective. If the unit lot of product is not defective, the unit lot of product is allowed to proceed to a subsequent process, and if the unit lot of product is defective, the product is discarded.

According to the method for controlling semiconductor fabrication equipment, even when the operator accidently pushes an operating button to operate the interlocked equipment before any appropriate action has been taken thereon, it can be determined whether or not the following lot should be introduced into the equipment, by using the interlocking information of the tracking module stored in the host computer. Accordingly, it is possible to prevent the operator from accidently operating the interlocked equipment.

BRIEF DESCRIPTION OF THE ATTACHED DRAWINGS

The accompanying drawings illustrate an embodiment of the invention, in which:

FIG. 1 is a flowchart of a conventional method for controlling semiconductor fabrication equipment; and FIG. 2 is a flowchart of a method for controlling semiconductor fabrication equipment according to the present invention.

DETAILED DESCRIPTION OF PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those having skill in the art.

FIG. 2 is a flowchart of a method for controlling semiconductor fabrication equipment according to the present invention. The method mainly includes eight steps as follows. An embodiment of the method will be described by way of an example of a process in which a product 'a' is fabricated in equipment 'A'.

At step 100, optimal conditions for respective steps of the process to be performed in the equipment 'A' are registered (set or saved) in a memory of a host computer.

At step 110, a unit lot including about 20 to 25 wafers is installed in the equipment 'A'. Then the process is performed on the wafers in the unit lot individually.

At step 120, the process conditions are reported to the host computer when the respective wafers of the unit lot have been completely processed. At step 130, in order to determine whether or not the respective steps were carried out normally, it is determined whether or not the reported process condition data are in the range of the optimal process conditions for the respective steps registered in the data base of the memory using a specific module of the host computer. The range of the optimal process conditions is defined by the limits within which the equipment can operate without causing any defects in the products.

At step 140, if it is determined that the reported data are in the range of the optimal process condition registered in the host computer at the step 130, it is determined whether or not the reported data satisfies a specific rule that is a control limit derived from statistical process control (SPC) of the process by the host computer.

If it is determined that the reported data satisfy the specific rule at step 140, then step 100 through step 130 are repeatedly performed until the whole process is completed so that the product 'a' can be moved along to another process.

On the other hand, if it is determined that the reported data do not satisfy the specific rule, at steps 150 and 160, the tracking module of the host computer and the equipment 'A' are simultaneously interlocked and thereby the intrinsic number of the interlocked equipment 'A' is automatically saved in the host computer at the same time that the equipment 'A' is interlocked in order to prevent other products, for example, product 'b', product 'c', product 'd' and the like, from being introduced into the equipment 'A'. Appropriate action is then undertaken to solve the problem in the equipment 'A'. Once the problem is solved, the equipment 'A' is returned to the fabrication process. The tracking module also functions to input into a terminal of the host computer the information that a process with a product is beginning.

There are four instances when the reported data do not satisfy the specific rule: when the reported data are outside the control limit of the specific rule used in SPC, i.e., the upper control limit (UCL) or the lower control limit (LCL); when a continuous upward trend or a continuous downward trend occurs in the reported data; when two of three successive points in the reported data exist in the zone between $2\sigma$ and $3\sigma$ above or below a mean value used in SPC; and when four of five successive points in the reported data do not fall into the zone between $-1\sigma$ and $1\sigma$ of the mean value.

By simultaneously interlocking the tracking module of the host computer and the equipment, the state of the equipment recognized by the host computer matches the actual state of the equipment. Thereby, the interlocked equipment can be identified in the host computer.

As a result, even when the operating button is accidently pushed by an operator, the host computer can recheck whether or not the following lot should be introduced into the equipment before the equipment 'A' that is automatically saved in the host computer is operated. Accordingly, difficulties in administration of equipment can be solved to a certain degree. At the same time, defect occurrence related to the difficulties in administration of equipment can be maximally reduced. This results in enhanced reliability of semiconductor fabricating processes.

At steps 170 and 180, if it is determined that the reported data are not in the range of the optimal process condition registered in the host computer, the product 'a' is withheld from further processing and analyzed so that appropriate action is taken by the engineer.

At steps 190 and 200, the product 'a' is measured to determined whether or not it is defective. If it is determined that the product 'a' is not defective, further processing is performed. Otherwise, if it is determined that the product 'a' is defective, it is discarded.

According to the method, even when the operator accidently pushes the operating button before the problem with the interlocked equipment has been solved, the computer can retrieve the information of which piece of equipment is presently interlocked. This means that the host computer can recheck whether or not to introduce the following lot into the equipment. Accordingly, it is possible to prevent the operator from accidently operating the interlocked equipment.

As aforementioned, according to the present invention, process failure that cannot be recognized by the equipment, such as process failure associated with an operator's mistake in operating the equipment, functional defects in the equipment, or an incorrectly designated process condition for the equipment, can be discovered immediately after a process has been completed. This results in rapid stabilization of the process, minimized defects and thereby enhanced reliability of the semiconductor fabrication process. Defect occurrence in the semiconductor products can be reduced by discarding the defective products that cannot be repaired. Moreover, even when the operator accidently operates the equipment before any appropriate action has been taken on the interlocked equipment, the host computer can recheck whether or not to introduce the following lot into the interlocked equipment using the interlocking information of the tracking module saved in the host computer. Thereby the interlocked equipment can be prevented from being accidently operated. Accordingly it is possible to overcome the difficulties in administration of equipment.

This invention has been described above with reference to the aforementioned embodiment. It is evident, however, that many alternatives, modifications and variations will be apparent to those having skill in the art in light of the foregoing description. Accordingly, the present invention embraces all such alternatives, modifications and variations as fall within the spirit and scope of the appended claims.

What is claimed is:

1. A method for controlling semiconductor fabrication equipment, comprising:

reporting, to a host computer connected to a fabrication equipment, process condition data indicative of a process being performed on a unit lot of product in said fabrication equipment;

determining whether or not said reported process condition data are in a range of optimal process conditions for said process as registered in a data base of said host computer;

if it is determined that said reported process condition data are in said range of optimal process conditions, determining whether or not said reported process condition data satisfy a specific rule registered in said host computer;

if it is determined that said reported process condition data are not in said range of optimal process conditions, holding and analyzing said unit lot of product processed through said process and taking appropriate action based on the analysis;

if it is determined that said reported process condition data satisfy said specific rule, allowing said unit lot of product to proceed to a subsequent process;

if it is determined that said reported process condition data do not satisfy said specific rule, simultaneously interlocking said fabrication equipment and a tracking module of said host computer, automatically saving information on said interlocking in said host computer, and stopping said process until a cause of process failure is determined and removed; and repeatedly performing the method until fabrication of said unit lot of product is completed.

2. The method according to claim 1, further comprising:

after analyzing said unit lot of product processed through said process and taking appropriate action, determining whether or not said unit lot of product is defective;

if said unit lot of product is not defective, allowing said unit lot of product to proceed to a subsequent process; and if said unit lot of product is defective, discarding said unit lot of product.

3. The method according to claim 1, wherein said specific rule is a control limit derived from statistical process control (SPC) of said process.

* * * * *